(12) United States Patent
Traub et al.

(10) Patent No.: US 11,967,100 B2
(45) Date of Patent: Apr. 23, 2024

(54) CAMERA BASED BOAT LOADING ASSISTANT

(71) Applicants: ZF Friedrichshafen AG, Friedrichshafen (DE); ZF MARINE PROPULSION SYSTEMS MIRAMAR, LLC, Miramar, FL (US)

(72) Inventors: Stefan Traub, Friedrichshafen (DE); Gabriela Jager, Friedrichshafen (DE); Lars Hoffmann, Fort Lauderdale, FL (US); Andrew Orvieto, Plantation, FL (US)

(73) Assignees: ZF Friedrichshafen AG, Friedrichshafen (DE); ZF Marine Propulsion Systems Miramar, LLC, Miramar, FL (US)

( * ) Notice: Subject to any disclaimer, the term of this patent is extended or adjusted under 35 U.S.C. 154(b) by 656 days.

(21) Appl. No.: 17/160,652

(22) Filed: Jan. 28, 2021

(65) Prior Publication Data
US 2022/0234490 A1    Jul. 28, 2022

(51) Int. Cl.
*G06T 7/73* (2017.01)
*B60P 3/10* (2006.01)

(52) U.S. Cl.
CPC .............. *G06T 7/73* (2017.01); *B60P 3/1066* (2013.01); *B60P 3/1075* (2013.01); *G06T 2207/30204* (2013.01); *G06T 2207/30252* (2013.01)

(58) Field of Classification Search
CPC ............ G06T 7/73; G06T 2207/30204; G06T 2207/30252; B60P 3/1066; B60P 3/1075
(Continued)

(56) References Cited

U.S. PATENT DOCUMENTS

| 3,447,815 A | 6/1969 | West |
| 3,720,967 A | 3/1973 | Rice |

(Continued)

FOREIGN PATENT DOCUMENTS

| DE | 20 2019 218 929 A1 | 6/2021 |
| DE | 10 2020 201 785 A1 | 8/2021 |

OTHER PUBLICATIONS wiki.ros.org/aruco_mapping; at least as early as Oct. 10, 2015 See Spc., p. 2.
(Continued)

*Primary Examiner* — Kerri L McNally
(74) *Attorney, Agent, or Firm* — Finch & Maloney PLLC

(57) ABSTRACT

A navigational system and method for guiding a boat onto a trailer, which comprises at least one marker mounted on the trailer; a camera located on the boat to assist the system with determining a longitudinal axis of the boat, and generating images of at least a front area of the boat and the at least one marker; an image processing unit for 1) receiving and processing the images to determine the at least one marker, 2) estimating the longitudinal axis of the trailer, 3) generating a desired boat trajectory for aligning the longitudinal axis of the boat with the longitudinal axis of the trailer; and 4) periodically generating guidance output commands to the user to assist the user with following the desired boat trajectory and facilitate loading of the boat on the trailer; and an image display for sequentially displaying the generated images of the camera to a user.

19 Claims, 5 Drawing Sheets

(58) Field of Classification Search
USPC .......................................................... 340/988
See application file for complete search history.

(56) References Cited

U.S. PATENT DOCUMENTS

| | | | |
|---|---|---|---|
| 4,011,958 A | | 3/1977 | Carrick |
| 4,114,920 A | | 9/1978 | Boettcher |
| 4,429,893 A | | 2/1984 | Palamara |
| 5,191,328 A | * | 3/1993 | Nelson .................... G01S 11/16 702/159 |
| 9,904,293 B1 | * | 2/2018 | Heap ........................ G05D 1/12 |
| 10,011,211 B1 | * | 7/2018 | Gutierrez ................ B63C 13/00 |
| 10,632,803 B2 | * | 4/2020 | Niewiadomski ... B62D 15/0285 |
| 2009/0302572 A1 | | 12/2009 | Bryant, II |
| 2015/0307094 A1 | | 10/2015 | Ito et al. |
| 2016/0264220 A1 | * | 9/2016 | Laceky ................. B60P 3/1075 |
| 2016/0368578 A1 | | 12/2016 | Walke |
| 2018/0050772 A1 | | 2/2018 | Koyano et al. |
| 2018/0194263 A1 | * | 7/2018 | Eigenheer ............. B60P 3/1075 |
| 2019/0285769 A1 | | 9/2019 | Lindmark et al. |
| 2020/0317126 A1 | * | 10/2020 | Watanabe ............ B62D 15/027 |

OTHER PUBLICATIONS

J. Higinbotham et al., "Update on the Development and Testing of a New Long Duration Solar Powered Autonomous Surface Vehicle", IEEE, 2008, pp. 1-10.

J. Paulos et al., "Automated Self-Assembly of Large Maritime Structures by a Team of Robotic Boats", IEEE Transactions on Automation Science and Engineering, vol. 12, No. 3, Jul. 2015, pp. 958-968.

* cited by examiner

CAMERA BASED BOAT LOADING ASSISTANT

FIELD OF THE INVENTION

This present invention generally relates to navigation, and more particularly to a system and a method which include a mobile device that assists the user with aligning a vehicle or vessel, such as a boat, with an associated trailer as the vehicle or vessel approaches the trailer to facilitate safe and accurate loading of the vehicle on the trailer for subsequent transport and/or storage of the same on the trailer.

BACKGROUND OF THE INVENTION

It is known that loading of a vehicle, such as boat, onto a trailer may be difficult, given the variability in ramp dimensions (i.e., the ramp length, the ramp width, the ramp inclination, etc.), the wind speed and the wind direction, the current wave conditions as well as the navigational skill of the operator of the vehicle.

In addition, boat ramps are frequently crowded with boaters facing substantial waiting times for access to the boat ramp in order to permit the boater to load or unload his/her boat on a trailer at the boat ramp. Such loading and unloading situations are often high pressure in nature since each operator, when his/her turn comes to launch or retrieve his/her vessel, tries to load/unload the vessel as quickly and efficiently as possible so as not to further hold up the boat loading/unloading queue at the boat ramp.

Further compounding the loading/unloading process is that boats are frequently loaded/unloaded from a trailer by a single operator, with no additional guidance or assistance from any other individual during the entire loading/unloading process.

Moreover, it is to be appreciated that damage may possibly occur, particularly during the boat loading process, to either the boat, the trailer, or both, or possibly damage may occur to a tow vehicle, e.g., a car or a truck, from being driven too far down the loading ramp so as to be unacceptably partially submerged in the water. It is to be appreciated that such damage can be very costly to repair and is generally to be avoided.

While the above noted problems are more often occur to individuals who are relatively new to boating and/or are generally inexperienced or have a lack of adequate training and/or skill, it is to be appreciated that even an experienced operator may also have difficulty in loading a boat on a trailer and/or an increased risk of causing damage to the boat and/or the trailer during a single person loading/unloading operation.

In view of the above drawbacks associated with the prior art loading/unloading techniques and operations, it would be beneficial for an operator to have a system which would consistently and reliably assist the operator with safely and efficiently guiding his/her boat, toward the associated trailer, and properly aligning and loading the boat on the trailer during the first attempt.

It is noted that a few prior inventions have proposed some solutions to the above noted problems. For example, a conventional marker-based navigation is described at http://wiki.ros.org/aruco mapping.

Also known is U.S. Publication No. US2016/0264220 relates to a system and method for assisting with the loading of a boat at a desired parking target, such as boat trailer or dock. In one example, a light source is provided on a boat trailer to illuminate the trailer. A forward facing camera and corresponding monitor are provided on a boat. As the boat approaches the boat trailer, the light source makes the boat trailer more visible, especially in low light conditions. The light source is also visible on the monitor, making it easier for a boat operator to guide the boat to the trailer.

U.S. Publication No. US2016/0368578 relates to a method and apparatus using a camera and image display for improving navigation of the watercraft. The system may be used by a helmsman to view regions outside his/her unaided sight range. Objects ahead of and behind the watercraft, both above and beneath the surface, may be detected and navigation decisions are made thereby. The same method and apparatus may be used to improve viewing while backing a trailer. In any event, the images may be recorded for later viewing.

U.S. Pat. No. 10,011,211 relates to a trajectory module which is configured to determine a trajectory of a boat located in water behind a trailer that is hitched to a vehicle based on an image behind the vehicle captured using a rear facing camera of the vehicle. An illuminating module is configured to turn a right brake light of the vehicle ON and OFF when the trajectory of the boat is left of a longitudinal axis of the trailer and to turn a left brake light of the vehicle ON and OFF when the trajectory of the boat is right of the longitudinal axis of the trailer.

SUMMARY OF THE INVENTION

Wherefore, it is an object of the present invention to overcome the above mentioned shortcomings and drawbacks associated with the prior art loading and unloading techniques and processes.

The present disclosure relates to a navigation system and method embodying the invention includes an image processing unit, typically incorporated in a mobile device, used in combination with either an internal and/or external camera. The camera is located in the boat, or possibly hand held, while at least one associated tag(s)/target(s)/marker(s) is/are secured on a boat trailer. The navigation system uses the camera and the image processing unit to determine the longitudinal axis of the boat, the longitudinal axis of the trailer, and a desired boat loading trajectory to follow in order to properly and safely align the longitudinal axis of the boat with the longitudinal axis of the trailer and thereby safely and efficiently load the boat onto the trailer.

The navigation system utilizes the (main) display screen of a mobile device to display a current image of the boat loading process, obtained by the camera, and informs the user, via an overlay display (overlaid images, augmented reality acoustics signal or vibrations) which is displayed on a display screen, over a current image of the boat loading process, to provide a visual indication to the user (boat operator) relating to how closely the boat is following the desired boat loading trajectory when approaching the trailer.

During a boat loading operation, the navigation system determines a desired boat loading trajectory to be followed by the boat, during the boat loading process, and generates guidance output commands to the boat operator, e.g., recommends to the boat operator to maintain the current course, or possibly does not provide any recommendation, when the navigation system determines that the boat is following along the desired boat loading trajectory. When the boat is straying from the desired boat loading trajectory, the navigation system generates guidance output commands to the boat operator, e.g., to turn toward the port (left) side or to turn toward the starboard (right) side, until the boat is again back on course. Such commands thereby assist the boat operator with following along the desired boat loading trajectory and safely and efficiently loading the boat on the associated trailer.

According to one variant of the disclosure, the navigation system will generate an optional overlay, in a real-time view looking forward from the boat, displaying, over a current image generated by the camera, the desired boat loading trajectory from the boat to the associated trailer in order to assist the boat operator with visually following the desired boat loading trajectory for safely and efficiently loading the boat on the associated trailer.

According to another variant of the disclosure, the navigation system and method may optionally generate additional graphics to inform the user, in real time, whether or not the user is tracking/following along the desired boat loading trajectory, based on the current position of the boat, the current velocity of the boat, as well as the current environmental conditions, e.g., the wind speed, the wind direction, the wave action, the wave direction, etc., being experienced by the boat during such boat loading/unloading operation.

During operation of the navigation system, the camera is continuously viewing and inputting images to the image processing unit of the navigation system, and the navigation system then processes such received images by analyzing the inputted images to detect tag(s)/target(s)/marker(s) and the current position of the boat as well as detecting movement and localizing the boat with respect to the tag(s)/target(s)/marker(s), including roll, yaw, pitch and position so as to assist the user (boat operator) with safely and efficiently loading the boat on the associated trailer.

The navigation system and method may detection of up to 3 targets simultaneously in an image under changing background conditions, e.g., during daylight and working under various background scenarios. The navigation system and method then estimates of the position (translation with 3 degrees of freedom and rotation with 3 degrees of freedom) of the detected tag(s)/target(s)/marker(s) with respect to camera in camera with 3D coordinates under assumption of intrinsic camera properties, as available, in the mobile phone. If unavailable, the system and method will utilize default values. The minimum detection distance of the navigation system and method, with respect to tag(s)/target(s)/marker(s) having a size of 5.9 inches×5.9 inches (15 cm×15 cm), is about 38 yards or so (about 35 meters or so).

The detected target information can provide the relative distance and angle from the mobile device to the tag(s)/target(s)/marker(s) and is able to continuously refresh the overlay with respect to the center of the detected tag(s)/target(s)/marker(s).

The disclosure further relates to a navigational system for guiding a boat onto a trailer, the navigational system comprising: at least one marker mounted on the trailer so as to assist the navigational system with estimating a longitudinal axis of the trailer; a camera being located on the boat to assist the navigational system with determining a longitudinal axis of the boat, and the camera being located so as to generate images of at least a front area of the boat and the at least one marker on the trailer, during a loading operation; an image processing unit for receiving and processing at least some of the images from the camera to determine the at least one marker, and, upon determining the at least one marker, the image processing unit estimating the longitudinal axis of the trailer; the image processing unit, based upon the longitudinal axis of the boat and the longitudinal axis of the trailer, generating guidance information to assist a user with aligning the longitudinal axis of the boat with the longitudinal axis of the trailer and facilitate loading of the boat on the trailer.

The disclosure further relates to a method of guiding a boat onto a trailer, the method comprising: mounting at least one marker on the trailer so as to assist the method with estimating a longitudinal axis of the trailer; positioning a camera on the boat to assist the navigational system with determining a longitudinal axis of the boat, and the camera being positioned so as to generate images of at least a front area of the boat and the at least one marker on the trailer, during a loading operation; receiving and processing, via an image processing unit, the images from the camera to determine the at least one marker, and, upon determining the at least one marker, estimating the longitudinal axis of the trailer; generating, via the image processing unit, based upon the longitudinal axis of the boat and the longitudinal axis of the trailer for aligning the longitudinal axis of the boat with the longitudinal axis of the trailer and facilitate loading of the boat on the trailer; and periodically generating guidance output commands to the user, via the image processing unit, during the loading operation to assist the user with following the desired boat trajectory and facilitate loading of the boat on the trailer.

BRIEF DESCRIPTION OF THE DRAWINGS

The accompanying drawings, which are incorporated in and constitute a part of the specification, illustrate various embodiments of the disclosure and together with the general description of the disclosure given above and the detailed description of the drawings given below, serve to explain the principles of the disclosure. The disclosure of the invention will now be described, by way of example, with reference to the accompanying drawings in which:

FIG. 1A is a flow diagram showing downloading the application onto a conventional mobile device and inputting of general information, while

Figure 1A:
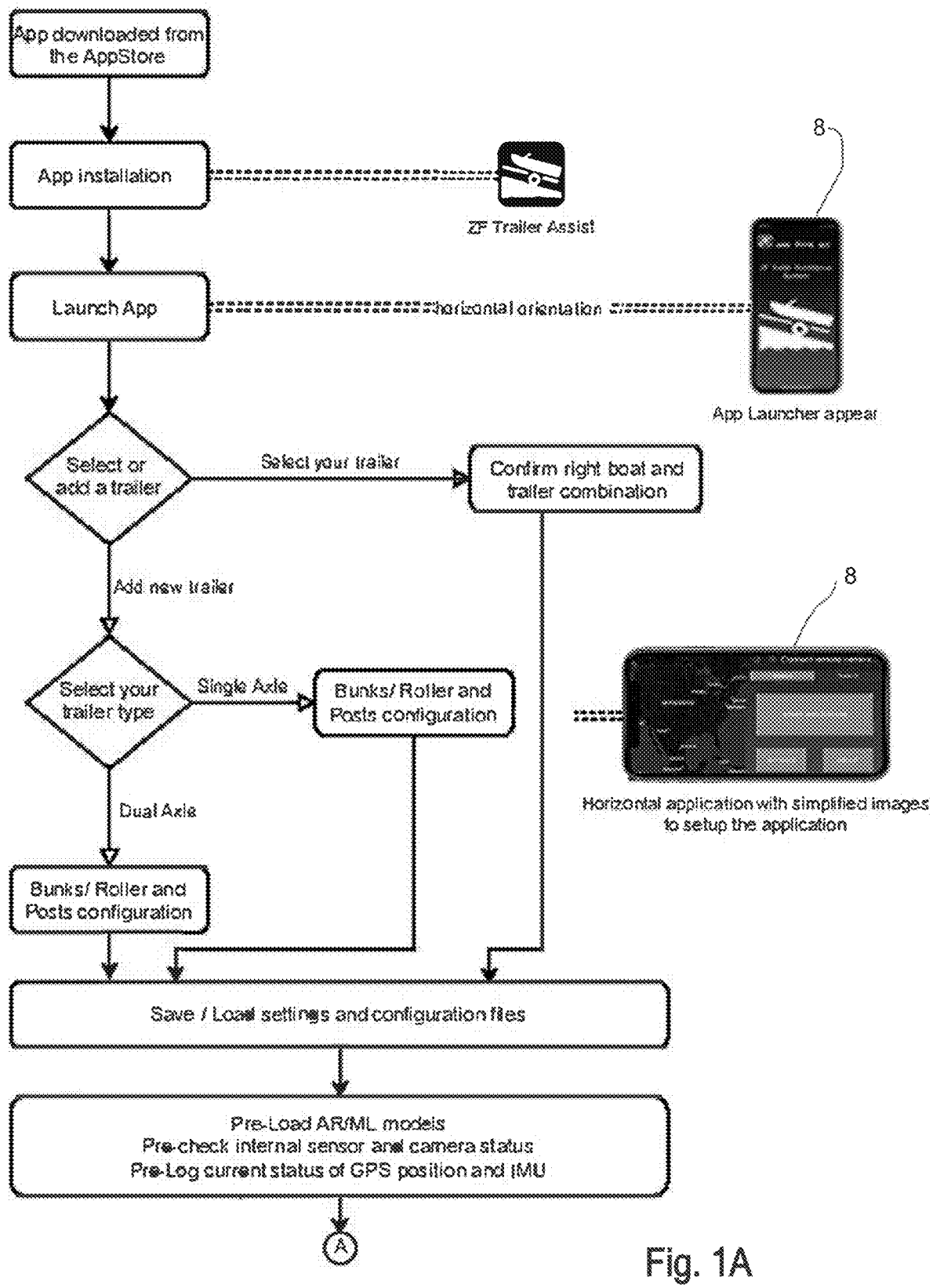
Figure 1B:
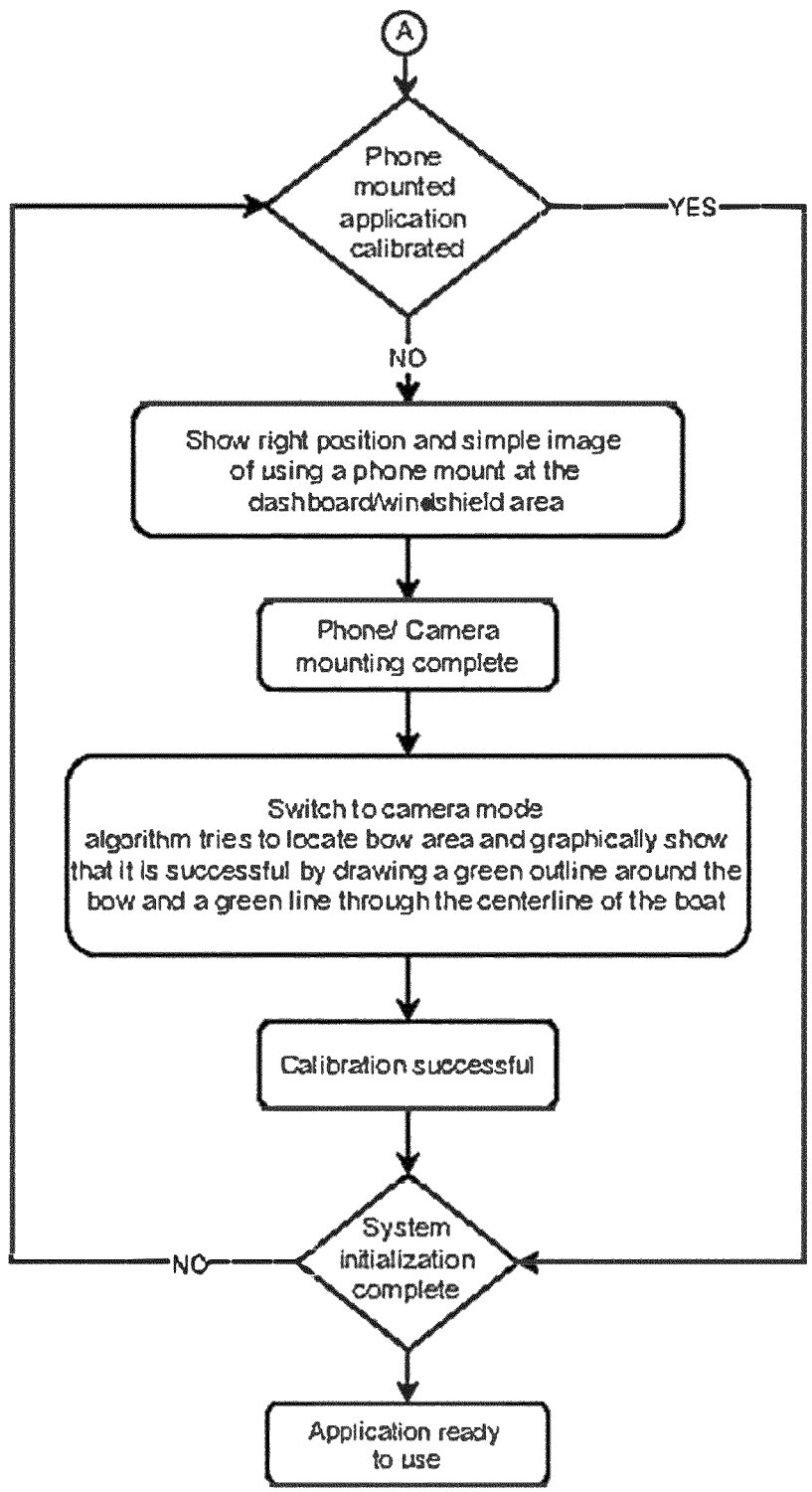
FIG. 1B is a flow diagram showing caliberation of the camera prior to use.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION OF THE PREFERRED EMBODIMENTS

An example of a boat loading/unloading navigation system 2, embodying the invention as generally shown in FIGS. 1A-4, 6 and 7, will now be described in detail. As generally shown, the navigation system and method 2 comprises a vehicle, a vessel or a boat 4 (hereinafter generically referred to as a "boat"), an associated trailer 6 upon which the boat 4 is to be loaded, a mobile device 8, e.g., a smart phone, tablet, laptop, etc., for guiding the boat 4 on to the associated trailer 6, and a camera 12 for viewing the loading operation from a vantage point on the boat. As is conventional in the art, the associated trailer 6 is towed by an associated conventional towing vehicle 10.

As generally shown in FIG. 1A, the user will visit a conventional "App Store" and search for the trailer loading/unloading assist software, i.e., the App, and, thereafter, download the same on the user's mobile device 8. Once this has occurred, the user will then launch the App on his/her mobile device 8. After launching the App, the App will then first typically prompt the user to either enter the manufacturer, the model, and the year of manufacture of the boat 4 and also ask the user to select or verify the trailer 6, e.g., the manufacturer, the model, etc., upon which the boat 4 is to be loaded/unloaded. Next, the App will typically confirm that the boat 4 can be properly and safely loaded/unloaded on and off the selected trailer 6. Assuming that the selected boat 4 can be properly loaded/unloaded from the selected trailer 6, then the preloaded information, previously stored within the App, e.g., the length and the width of the boat, the length and the width of the trailer, etc., concerning both the selected boat 4 as well as the selected trailer 6, are typically saved and stored in memory and the App files are correspondingly configured for use during operation. However, in the event that the App determines that the boat cannot be properly loaded on the selected trailer 6, then a suitable warning will be generated by the App and displayed on the (main) display screen 24 of the mobile device 8, e.g., this boat is not designed for safe loading on this trailer.

During operation of the App by a user for the first time, or in the event that the user recently purchased another boat, etc., the user may elect to enter/select the type and the manufacturer of the trailer and also select whether the trailer is a single axle or a double axle trailer, although such information is not required. After making such trailer selections, the user will then typically also select whether the boat supporting bed of the trailer 6 is equipped with either a plurality of rollers, has set of stationary bunks, etc., upon which the boat will be supported during transportation and storage. Further, the user may also be required to select if the trailer 6 is equipped with one or more posts, and, if the trailer 6 has a plurality of posts, also select the post configuration of the trailer 6, e.g., a winch post at the front of the trailer 6 and a pair of guide/side posts at the rear of the trailer 6, etc.

After all of the necessary boat and trailer selections are made and entered into the App and the preloaded information is correspondingly saved and stored in memory, then the files are correspondingly configured/updated in preparation for use of the App during a loading operation. Next, the App then checks operation of the integrated camera 12 of the mobile device 8, the internal sensors (e.g., the accelerometer, the GPS sensor, etc.) of the mobile device 8, to insure that they are all functioning properly, and the augmented reality/machine learning (AR/ML) models are preloaded into the App. In addition, the current status or current position of the mobile device 8, based upon the global positioning system (GPS), and the inertial measurement unit (IMU) are typically also pre-logged into the software of the App.

It is to be appreciated that a wireless camera may possibly be utilized by the navigation system and method 2 instead of the integrated camera 12 of the mobile device 8. In the event that a wireless camera 12 is utilized, the wireless camera 12 will communicate wirelessly, e.g., by Bluetooth® technology, with the internal processor of the mobile device 8, or some other processing unit, for sending images thereto during use of the navigation system 2, as discussed below in further detail. In addition, when a wireless camera 12 is utilized, it may be possible to mount the same directly along the longitudinal axis of the boat LAB and thereby avoid having to determine the boat longitudinal axis LAB, as discussed below, since the camera 12 is known to be physically aligned with the longitudinal axis of the boat LAB. Hereinafter, the disclosure will make reference to the camera 12 which is intended to include and cover both the wireless camera 12 as well as the integrated camera 12 of the mobile device 8.

Once the mobile device 8 is set up for use, the camera 12 is may be releasably mounted, via a camera bracket 16, to the windscreen of the vessel, for example, or supported or held at some other conventional navigational and vantage point of the operator of the boat, i.e., typically a few feet or so vertically above a top perimeter edge of the bow of the boat and typically near the helm. The camera bracket 16 may be mount to the windshield or to a console of the boat, for example, and is typically designed to support the mobile device 8 about its perimeter edge, without blocking or hindering the field of view of the camera 12 of the mobile device 8, while at the same time, still permitting view of the (main) display screen 24 of the mobile device 8 by the user while the App is running. Alternatively, the integrated camera 12 and the mobile device 8 may possibly be held by a hand(s) of the user, but such hand held use of the mobile device 8, running the App, is typically somewhat less accurate, due to movement of the mobile device 8, relative to the boat 4, during a loading operation and also may hinder the ability of the user to safely maneuver the boat, during the loading operation, while also holding the mobile device 8 in his/her hand(s).

It is to be appreciated that the camera bracket 16 must mount to the boat at a sufficiently high vantage point on the boat (or possibly being hand held by the user) so that the camera 12 is able to view (see FIG. 4): 1) at least the front bow area 20 of the boat, 2) the loading area 22 of the associated trailer 6 upon which the boat is to be loaded, and 3) at least a portion of the water 23 located between the bow of the boat 4 and the associated trailer 6 upon which the boat is to loaded. Preferably, the viewable bow area 20 of the boat (e.g., at least one meter or a quarter of a length of the boat 6) is viewable within the field of view of the camera 12. It is to be appreciated that the greater the amount of the bow area 20 of the boat 6 which is viewable or visible by the camera 12, the more accurate the inputted information being processed by the App.

Figure 2A:
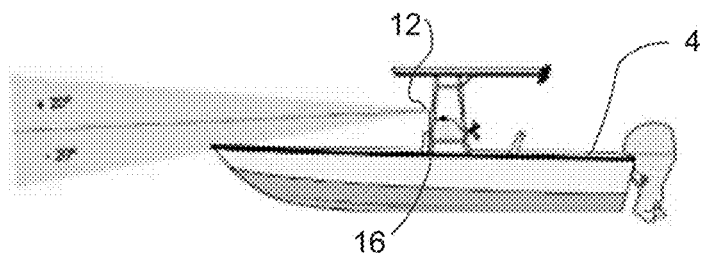
FIGS. 2A and 2B are diagrammatic views showing the horizontal and the vertical fields of view of the camera according to the disclosure.
Figure 2B:
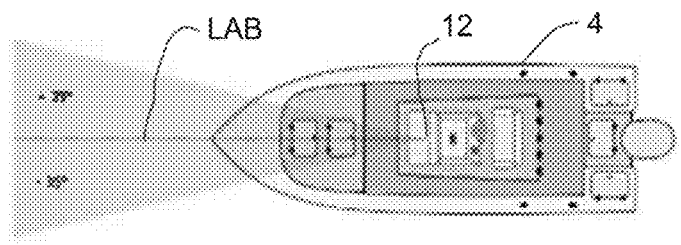

As generally shown in FIG. 2A, the vertical field of view of the camera 12 is typically about 20°±10° vertically above and below a central viewing axis of the camera 12. In addition, as generally shown in FIG. 2B, the horizontal field of view of the camera 12 is typically about 35°±15° toward the left and the right of the central viewing axis of the camera 12. It is to be appreciated that the field of view of the camera 12 can vary, from application to application, without departing from the spirit and scope of the present disclosure, e.g., cameras with wider fields of view ("fish eye") would also be appropriate.

After the mobile device 8 is properly and securely installed on the camera bracket 16 (or possibly being hand held by the user) then—in the event that the camera is not fixedly installed along the longitudinal axis of the boat LAB—calibration of the integrated camera 12 of the mobile device 8 is checked. In the event that calibration of the camera 12 is verified and deemed to be sufficiently accurate by the App, then the App indicates to the user that the navigation system and method 2 initialization process is completed (see FIG. 1B). However, in the event that the App is being utilized the first time by the user on the mobile device 8, or in the event that the initial calibration by the App was deemed unacceptable for some reason, then calibration of the camera 12 commences.

During such calibration, the App switches "on" the wireless camera or turns "on" the camera mode of the camera 12 of the mobile device 8 and the App then activates an algorithm which is utilized to scan the image, generated within the field of view of integrated camera 12, in order to locate various features of the bow area 20 of the boat 4. Upon successfully locating such features of the bow area 20 of the boat 4, the App may graphically generate, for some applications, an overlay outline of the perimeter of the bow area 20 of the boat, determined by the algorithm, on the (main) display screen 24 of the mobile device 8 over the current image (see FIGS. 3 and 4) and the App also may possibly graphically generate a centerline of the perimeter of the bow area 20 of the boat which is coincident with the longitudinal axis of the boat LAB, although neither graphical overlay is required.

In the event that the calibration was unsuccessfully, the App then returns to be beginning of the calibration process and this process is repeated until the perimeter of the bow area 20 of the boat 4 and the centerline/the longitudinal axis of the boat LAB is/are eventually determined. Upon successfully locating the bow area 20 of the boat 4, the App thereafter may possibly display, as an overlay, the detected bow area 20 of the boat, and possibly display the centerline, on the image currently being displayed on the (main) display screen 24 of the mobile device 8. The App is now ready to assist the user with loading the boat 4 on the trailer 6.

Alternative, it is possible for the user to visually align the camera 12 of the mobile device 8 such that the longitudinal axis of the boat LAB, as seen in the image being displayed on the (main) display screen 24 of the mobile device 8 by the user, extends substantially normal to a middle line of the image being displayed. As a result of such adjustment of the position/orientation of the camera 12 of the mobile device 8 relative to the longitudinal axis of the boat LAB, the middle line of the image being displayed the camera 12 is generally coincident with the longitudinal axis of the boat LAB (in the event that the camera 12 is located along the longitudinal axis of the boat LAB), or the middle line of the image being displayed the camera 12 is generally parallel to but slightly off set with respect to the longitudinal axis of the boat LAB (in the event that the camera 12 is located slightly on one side or the other of the longitudinal axis of the boat LAB). The App then assumes, during operation, that the middle line of the image being displayed the camera 12 is generally the longitudinal axis of the boat LAB and will align that assumed longitudinal axis of the boat LAB with the longitudinal axis of the trailer LAT.

Another possible technique for locating the features of the bow area 20 of the boat 4 is to extract edges, search for vertical symmetry line of edges, check assumption is maximal angle deviation boat axis to image vertical as consolidation. Alternatively, it would also be possible to utilize a "boat/axis" image-based classifier in order to determine the bow area 20 and longitudinal axis of the boat LAB. According to this alternative embodiment, the navigation system and method 2 would be trained—similar to a vehicle classifier—so as to recognize various features and/or components in the bow area 20 of the boat 4 so that the same, as well as the longitudinal axis of the boat LAB, may be identified and labeled.

Figure 3:
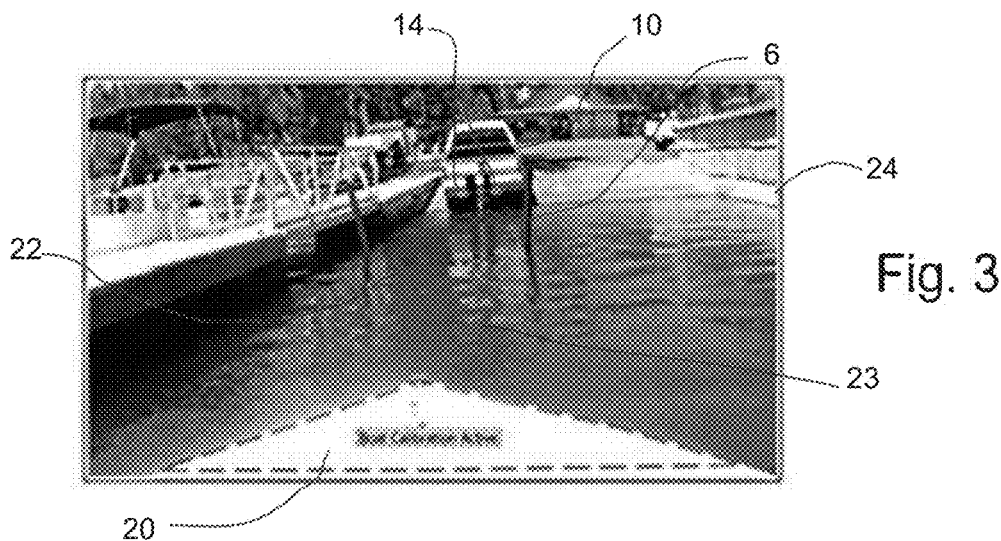
FIG. 3 is diagrammatic view showing, over a generated image, a possible overlay of the detected bow area of the boat, the trailer loading area of the trailer and the open water between the boat and the trailer.
Figure 4:
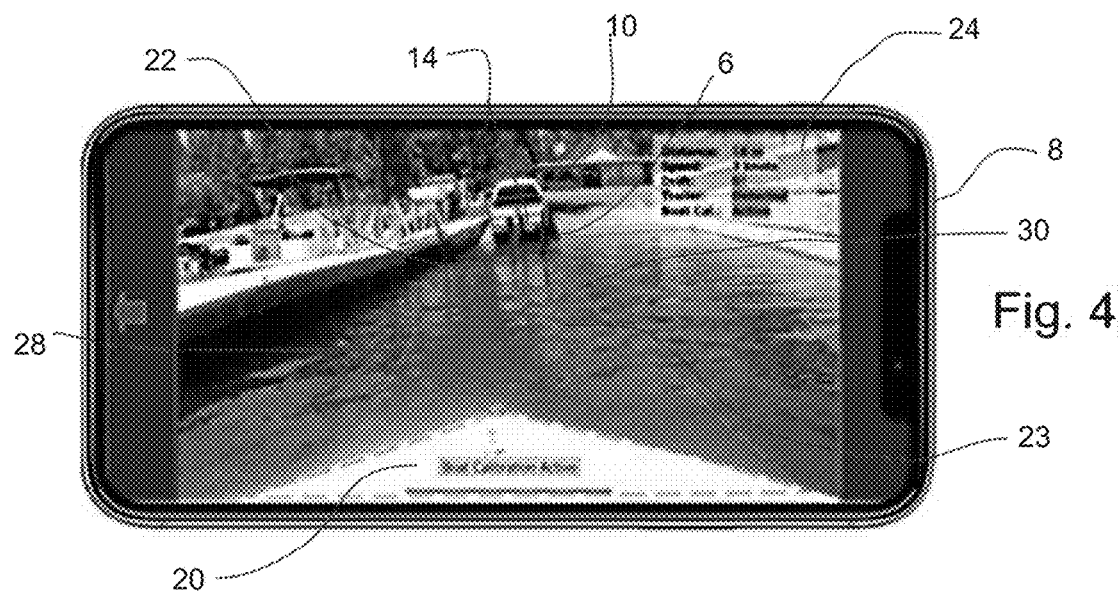
FIG. 4 is diagrammatic view showing, over a generated image, a possible overlay of the detected bow area of the boat, the trailer loading area of the trailer and the open water between the boat and the trailer as well as left and right trajectory guides.

As shown in FIGS. 3 and 4, the associated trailer 6 is equipped with at least one tag(s)/target(s)/marker(s) 14 and possibly two, three or more tag(s)/target(s)/marker(s) 14. As shown in these figures, two spaced apart tag(s)/target(s)/marker(s) 14 are supported by the associated trailer 6, e.g., typically by a tag(s)/target(s)/marker(s) bracket 18, for example, support by the winch post of the trailer 6 or a lower portion of the trailer frame adjacent the winch post. It is to be appreciated that only an elongate single tag/target/marker 14, having first and second portions thereof located on opposed sides of a longitudinal axis of the trailer LAT, may be sufficient for use as the tag/target/marker 14 according to the present disclosure, as long as the longitudinal axis of the trailer extends normal to and is coincident with the center of that elongate single tag/target/marker 14. It is to be appreciated that each tag(s)/target(s)/marker(s) 14 must face toward the rear of the trailer 6, so as to be readily visible and viewable by the camera 12 during the boat loading process, and generally lie in a vertical plane, which extends parallel to the longitudinal axis of the trailer LAT. For some applications, all of the tag(s)/target(s)/marker(s) 14 may lie in a common vertical plane, which extends parallel to the longitudinal axis of the trailer, while for other applications, one or more of the tag(s)/target(s)/marker(s) 14 may be located in a first vertical plane, which extends normal to the longitudinal axis of the trailer LAT, toward the front of the associated trailer 6 and adjacent the winch, while one or more of the target(s)/marker(s) may be located in another vertical plane, which extends normal to the longitudinal axis of the trailer LAT, toward the rear of the associated trailer 6.

In the event that all of the tag(s)/target(s)/marker(s) 14 are located on the associated trailer 6 in a single common vertical plane, then the reference position of the tag(s)/target(s)/marker(s) 14 will be an average 2D center position of each one of the detected tag(s)/target(s)/marker(s) 14. The tag(s)/target(s)/marker(s) 14 are positioned with respect to and supported by the trailer such that the longitudinal axis of the trailer LAT extends normal to the plane defined by the tag(s)/target(s)/marker(s) 14 and through a point located at a center between all of the tag(s)/target(s)/marker(s) 14. That is, the tag(s)/target(s)/marker(s) 14 are supported on the trailer 6 such that the longitudinal axis of the trailer LAT is generally aligned with and coincident with a point located and centered between all of the tag(s)/target(s)/marker(s) 14.

However, it is to be appreciated that positioning of all of the tag(s)/target(s)/marker(s) 14 in a common vertical plane is optional, and thus not required. During operation, as long as each one of the anticipated tag(s)/target(s)/marker(s) 14 is detected, they will all be averaged with one another to determine and estimate the longitudinal axis of the trailer LAT. If, however, all of the tag(s)/target(s)/marker(s) 14 are installed on the trailer 6 so as to lie within a common vertical plane and are arranged to be generally symmetrically with respect to the center line of the trailer 6, this tends to improve somewhat the accuracy of the navigation system and method 2.

Alternatively, if one or more of the tag(s)/target(s)/marker(s) 14 are located toward the front of the associated trailer 6 while one or more of the tag(s)/target(s)/marker(s) 14 are located toward the rear of the associated trailer 6, then the reference position of the tag(s)/target(s)/marker(s) 14 will still be an average 2D center position of the tag(s)/target(s)/marker(s) 14 which extends normal to the detected tag(s)/target(s)/marker(s) 14 and defines the longitudinal axis of the trailer LAT.

Figure 5:
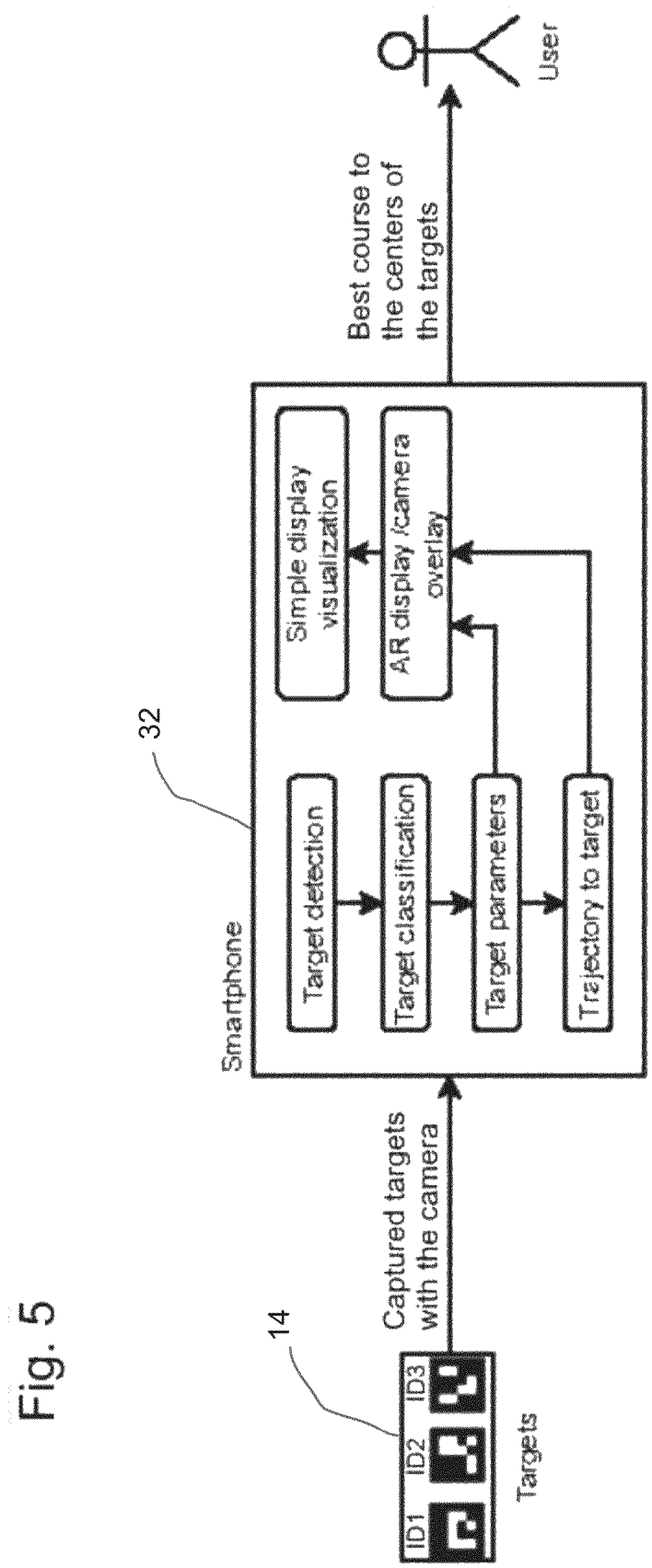
FIG. 5 is a diagrammatic view showing input of detected tag(s)/target(s)/marker(s) and processing of the same by the navigational system and method according to the disclosure.
Figures 6, 7:
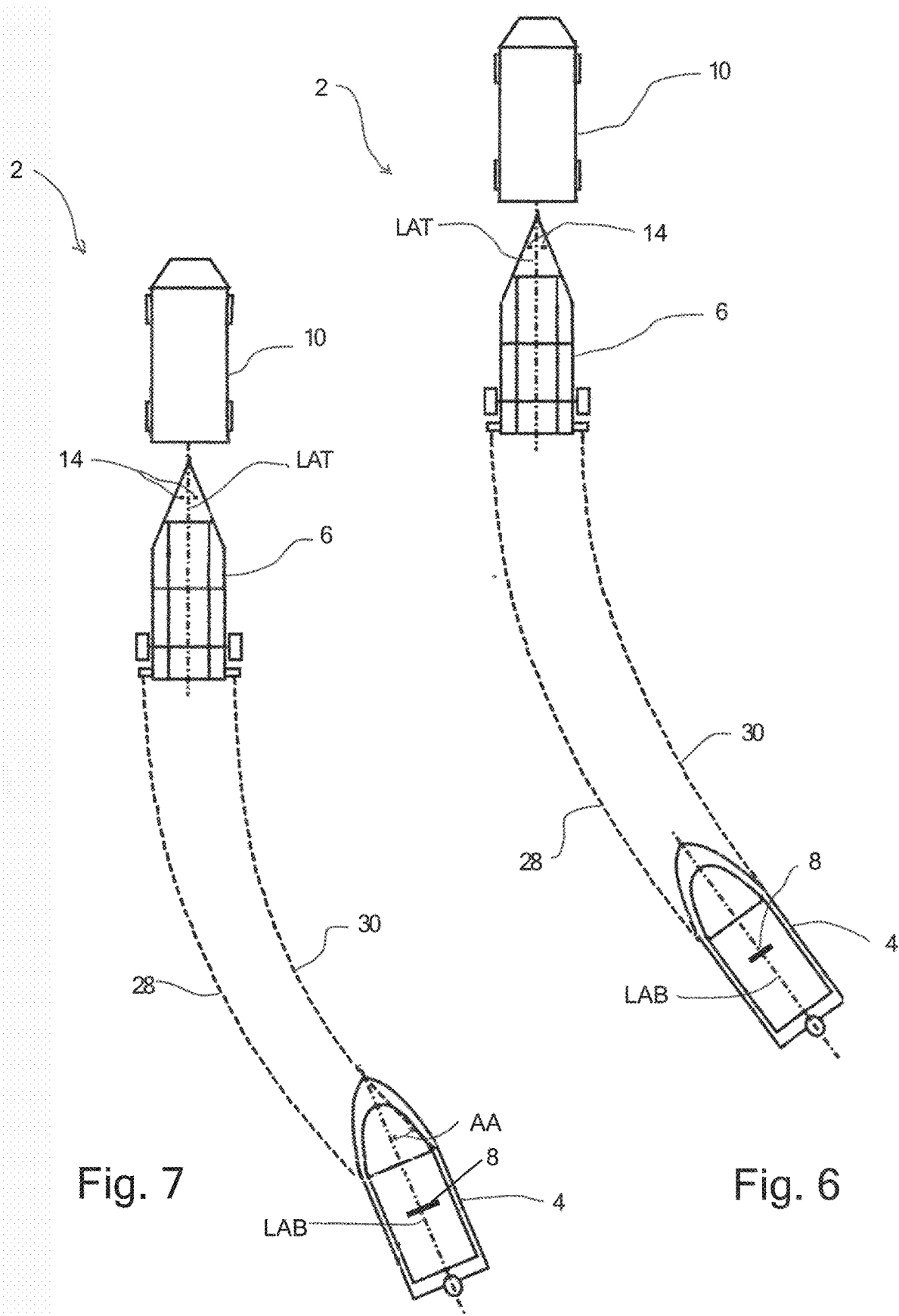
FIG. 6 is a diagrammatic representation of the navigation system showing one example of a desired boat trajectory for loading the boat on the associated trailer, with the trajectory guides being diagrammatically shown for guiding the boat toward the trailer.
FIG. 7 is a diagrammatic representation of the navigation system, similar to FIG. 6, showing the boat forming an acute angle with the right trajectory guide.

With reference now to FIG. 5, as diagrammatically shown, an image of each one of the tag(s)/target(s)/marker(s) 14 is sent as an input to the image processing unit 32. The image processing unit 32 will then attempt to reconstruct an image of the boat loading area 22 of the associated trailer 6 by utilizing each one of the detected tag(s)/target(s)/marker(s) 14. The image processing unit 32 will analyze and scan each inputted tag(s)/target(s)/marker(s) 14 and reject any tag(s)/target(s)/marker(s) 14 in the event that the same is either too large, too small, has an incorrect ID, etc. In the event that the image processing unit 32 is able to detect a complete set of tag(s)/target(s)/marker(s) 14 for the associated trailer 6, then the image processing unit 32 will compute a single reference position, relative to all of the detective tag(s)/target(s)/marker(s) 14, and this single reference position thus defines the longitudinal axis of the trailer LAT.

The camera 12 will continuously generate picture frames or images, during the boat loading process, and each such picture will generally include the bow area 20 of the boat, the loading area 22 of the associated trailer 6 upon which the boat is to be loaded and the water 23 located between those objects located within the field of view of the camera 12. As noted above, the image processing unit 32 will then sequently process each one of these generated and inputted images, by using the internal sensors of the mobile device 8, to identify the one or more tag(s)/target(s)/marker(s) 14 which are located within the image and on the associated trailer 6. Depending upon the amount of picture frames or images generated and supplied by the camera 12, the image processing unit 32 may only process every other, every third, etc., picture frame or image.

After the tag(s)/target(s)/marker(s) 14 are detected by the image processing unit 32, the image processing unit 32 will then classify each one of the detected targets as well as identifying target parameters of each one of the detected tag(s)/target(s)/marker(s) 14. The App will may optionally display a marker image overlay of each one of the detected tag(s)/target(s)/marker(s) 14, as part of a system image overlay, over the image just processed by the image processing unit 32, on the (main) display screen 24 of the mobile device 8. In addition, as noted above, the App may also display an image overlay of the bow area 20 of the boat 4 and possibly an image overlay of the boat loading area 22 of the trailer 6, all generally shown as 26. Based upon this detected information, the App will then generate and display a desired boat trajectory, e.g., a loading trajectory image overlay, toward the detected tag(s)/target(s)/marker(s) 14 supported by the associated trailer 6, including left and right overlay trajectory guides 28, 30 ("guidance information"). The desired boat loading trajectory is designed to align the longitudinal axis of the boat LAB with the longitudinal axis of the trailer LAT, and properly and efficiently load the boat on the associated trailer 6, provided that the boat follows the desired boat loading trajectory during a loading operation.

It is to be again noted that the detected tag(s)/target(s)/marker(s) image overlay, the boat longitudinal axis image overlay and the trailer longitudinal axis image overlay are optional. Generally, either the loading trajectory image overlay is provided on a display screen 24 ("guidance information") and/or audio/heptic guidance output commands ("guidance information") are generated by a speaker which communicates with the image processing unit so as to provide turning information/instructions to the user during the unloading/loading process.

Continuous Alignment Estimation of the Boat and Trailer Axes

During the loading or unloading operation of the boat, typically the boat is moving at a relatively slow, e.g., 1-3 knots per hour, and constant speed toward the associated trailer 6. At the same time, the camera 12 is constantly and continuously generating and sending images to the image processing unit 32 of the navigation system 2, e.g., at least 1 frame/image per second and more preferably at least 5 frames/images per second for processing by the image processing unit 32. For each received frame/image, during the entire duration of the loading or unloading process of the boat 4, the image processing unit 32 will 1) detect the tag(s)/target(s)/marker(s) 14 on the associated trailer 6 which are contained within the current frame/image being processed. Based upon that current image and the detected the tag(s)/target(s)/marker(s) 14, the image processing unit 32 will generate an estimate longitudinal axis of the trailer LAT while the camera 12 will provide an indication of the longitudinal axis of the boat LAB.

If desired, the image processing unit 32 may be provided with a time filtering module which is able to filter the processing of the images in order to reduce the effects of waves on the navigation system 2. It is to be appreciated that waves will lead to an oscillating position of the boat 4, relative to the associated trailer 6 and the tag(s)/target(s)/marker(s) 14 supported thereby. Such oscillations can be filtered out by a time filtering module in order to assist with improving the accuracy of the navigation system and method 2.

Once the longitudinal axis of the trailer LAT is determined by the navigation system and method 2, the navigation system and method 2 will then extend the longitudinal axis of the trailer LAT to infinity, along the z-axis, in the direction toward the approaching boat 4 to be loaded on the associated trailer 6. The navigation system and method 2 will then compute (estimated) a current angle between the longitudinal axis of the boat LAB and the longitudinal axis of the trailer LAT, and possibly estimate the current location of the boat 4 relative to the current location of the associated trailer 6. Thereafter, the navigation system and method 2 with then determine the desired boat loading trajectory for the boat 4 to follow for safely and efficiently loading the boat 4 on the associated trailer 6.

According to the disclosure, it is to be appreciated that the boat loading trajectory can be based upon an estimation of a whole host of desired trajectories utilizing the longitudinal axis of the trailer LAT, the longitudinal axis of the boat LAB, the starting distance of the boat 4 from the associated trailer 6 and an optional streaming. For example, the desired boat loading trajectory may, depending on the user input, included:
 a shortest trajectory from the boat to the associated trailer;
 a smoothest trajectory from the boat to the associated trailer;
 a trajectory with a smallest turning angle for loading the boat on the associated trailer;

a trajectory with the minimal amount of turns so as to maximize straight ahead travel of the boat when loading on the associated trailer;

a trajectory with a least amount of turning points for loading the boat on the associated trailer;

a safest trajectory for loading the boat on the associated trailer;

a slowest trajectory for loading the boat on the associated trailer; and/or a constant velocity trajectory for loading the boat on the associated trailer.

Once one of the above desired boat loading trajectories, or some other desired boat loading trajectory, is selected by the user (or possibly such selection may have been previously selected and loaded by the user during set up of the App), the navigation system and method 2 will then compute the (estimated) desired boat loading trajectory for loading the boat 4 on the associated trailer 6.

The (estimated) desired boat loading trajectory will include a pair of overlay left and right trajectory guides 28, 30, on the left and the right hand sides of the current longitudinal axis of the boat LAB and the longitudinal axis of the trailer 6 (see FIGS. 6 and 7 for example), to assist with proper loading of the boat 4 on the associated trailer 6

After the above estimated angles, positions and trajectory are determined, the navigation system and method 2 will then generate, over the most recently processed frame/image currently displayed on the (main) display screen 24 of the mobile device 8, an overlay image which includes: 1) a marker image overlay containing each one of the detected tag(s)/target(s)/marker(s) 14, 2) the detected longitudinal axis of the boat LAB (the boat longitudinal axis image overlay), 3) the detected longitudinal axis of the trailer LAT (the trailer longitudinal axis image overlay) and 4) the determined desired boat loading trajectory (the loading trajectory image overlay), to assist with loading the boat 4 on the associated trailer 6. The navigation system and method 2 are now ready to guide and properly load the boat 4 on the associated trailer 6.

During such guidance by the navigation system 2, additional images of the current position of the boat 4, relative to the associated trailer 6, are generated by the camera 12 and sent to the image processing unit 32 for processing. For each received frame/image, the image processing unit 32 will compare the current longitudinal axis of the boat LAB with the desired boat loading trajectory, i.e., is the current longitudinal axis of the boat LAB generally parallel to, centered and located between the generated pair of overlay left and right trajectory guides 28, 30, i.e., the loading trajectory image overlay as diagrammatically shown in FIGS. 4 and 6. In the event that this is the case, then the navigation system and method 2 determines that the boat 4 is currently following the desired boat loading trajectory. In such event, the navigation system and method 2 may indicate the same to the user by an audio guidance output command, e.g, "continue current course," emitted from a speaker (not shown in detail) associated with the image processing unit 32 or the mobile device 8 or possibly not provide any audio and/or heptic guidance output command to the user.

However, in the event that the navigation system and method 2 determines that the current longitudinal axis of the boat LAB is no longer generally parallel to, centered and located between the generated pair of overlay left and right trajectory guides 28, 30, this indicates to the navigation system and method 2 that the boat 4 is deviating from the desired boat loading trajectory. For example, if the longitudinal axis of the boat LAB is located closer to and/or forms an acute angle AA of greater than a few degrees or so with the overlay right trajectory guide 30 (see FIG. 7), then the navigation system and method 2 determine that the boat is drifting off course toward the right and will instruct the user to alter the current course by transmitting an audio and/or a heptic guidance output command(s) to the user, e.g, "turn (left) port side," as well as possibly providing a heptic guidance output command to the mobile device 8 of the user to indicate that corrective steering action is required.

Alternative, in the event that the navigation system and method 2 determines that the longitudinal axis of the boat LAB is significantly deviating from the proposed boat loading trajectory, e.g., the longitudinal axis of the boat LAB is currently intersecting with, forms an acute angle AA of greater than ten degrees or so with or is located on the opposite side of the overlay right trajectory guide 30, then the audio and/or heptic guidance output command(s) by the navigation system and method 2 will reflect such greater deviation, e.g, "turn hard toward (left) port side" and also possibly provide a corresponding heptic guidance output command to the user.

The navigation system and method 2 will repeat the above guidance process until the longitudinal axis of the boat LAB is again located generally parallel to, centered and located between the generated pair of overlay left and right trajectory guides 28, 30, e.g., the loading trajectory image overlay. However, in the event that the navigation system and method 2 determines that the boat 4 cannot be safely loaded on the associated trailer 6, given the current trajectory of the boat 4, the navigation system and method 2 will then instruct/command the user to abort the current loading procedure, return back toward the initial boat loading location and thereafter commence another attempt at loading the boat 4 on the associated trailer 6.

In a similar manner, in the event that the navigation system and method 2 determines that the longitudinal axis of the boat LAB is located closer to and/or forms an acute angle AA of greater than a few degrees or so with the overlay left trajectory guide 28, then the navigation system and method 2 determines that the boat is drifting off course toward the left and will instruct the user to alter the current course by transmitting an audio and/or a heptic guidance output command(s) to the user, e.g, "turn (right) starboard side," as well as possibly providing a heptic guidance output command to the mobile device 8 of the user to indicate that corrective steering action is required. If the navigation system and method 2 determines that the longitudinal axis of the boat LAB is significantly deviating from the desired boat loading trajectory, e.g., the longitudinal axis of the boat LAB is currently intersecting with, forms an acute angle AA of greater than ten degrees or so with or is located on the opposite side of the overlay left trajectory guide 28, then the audio and/or heptic guidance output command(s) by the navigation system and method 2 will reflect such greater deviation, e.g, "turn hard toward (right) starboard side" and also possibly provide a corresponding heptic guidance output command to the user.

The navigation system and method 2 will continue providing the user with appropriate guidance output commands until the boat 4 is safely and efficiently loaded on the associated trailer 6. As soon as this occurs, the boat loading operation discontinues and the navigation system and method 2 are discontinued. Thereafter, the user may possibly attach the hook winch to the eye hook on the front of the boat 4 and crank the winch so as to pull the boat further on to the trailer 6. Then, the user will enter the tow vehicle 10 and drive the tow vehicle 10 and loaded boat 4 away from the boat ramp and then stop at a safe location to continue securing and readying the boat 4 for transport on the trailer 6.

During the boat loading operation, the navigation system and method 2 is designed to estimate and align the angles between an image-based orientation of the longitudinal axis of the boat LAB, generated by the camera 12, with an image-based estimation of the longitudinal axis of the trailer LAT, generated from the tag(s)/target(s)/marker(s) 14 on the trailer 6. According to the present disclosure, it is to be appreciated that generally only the longitudinal axis of the boat LAB and the longitudinal axis of the trailer LAT and the desired boat loading trajectory need be determined by the navigation system 2. That is, there is no need for any other information relating to the boat, e.g., how long the boat 4 is, how wide the vessel 4, etc. As a result, there is also not any requirement to determine an absolute distance estimation, that is, the present disclosure merely requires eventual alignment of two vectors, e.g., a vector of the boat longitudinal axis and a vector of a longitudinal trailer axis, with one another prior to the boat 4 engaging with the associated trailer 6.

It is to be appreciated that the navigation system and method 2, according to the disclosure, can generate one or more warning sounds, warning lights and/or warning signals which may be periodically emitted, during operation of the navigation system and method 2, to assist the operator with safely and efficiently loading the boat onto the associated trailer 6. For example, a warning signal(s) and/or vibrational(s) may be emitted by the navigation system and method 2 in the event that speed of the boat is determined to be too fast for safely loading the boat on the associated trailer 6. In the event that the navigation system and method 2 determines that, given the current trajectory of the boat, it will not be possible for the longitudinal axis LAB of the boat to become properly aligned with the longitudinal axis LAT of the trailer, a "FAILED" message may be delivered to the user alone or in combination with one or more other appropriate warning sounds, warning lights and/or warning signals. In response to such warnings or failed message, the operator will then have to undertake drastic corrective action, e.g., rapidly slow down the travel speed of the boat 4, or possibly reverse the travel direction of the boat 4, in order to avert possible damage to the boat and/or trailer 6 and, thereafter, restart the boat loading process.

For acoustical guidance, the navigation system and method 2 can generate an acoustical signal which informs the user, due to frequency and/or tempo of the acoustical signal which is proportional to the distance the boat is from the trailer 6 and/or the relative alignment of the longitudinal axis of the boat LAB to the longitudinal axis LAT of the associated trailer 6 (similar to existing car parking sensors and their associated audible indicators). For example, the closer the boat 4 is located to the tag(s)/target(s)/marker(s) 14, the frequency and/or tempo of the acoustical signal thereby increases to indicated the same to the user. Alternatively or in addition, the navigation system and method 2 can provide haptic guidance, e.g., generates a vibration signal, which increases in frequency and/or tempo the closer the boat 4 is to the tag (s)/target(s)/marker(s) 14.

While the navigation system and method 2 for a boat is described above, it is to be appreciated that the principles of this disclosure are directly applicable and can be utilized for other applications, e.g., to assist with loading a large construction equipment or a vehicle onto an associated trailer 6. In view of this, the term "vehicle," as employed within this disclosure and the accompanying claims, is intended to mean and be construed to include any type of boat, vessel, piece of heavy equipment, vehicle, etc., which may be loaded on an associated trailer 6 and transported from one location to another location.

Inasmuch as the invention is subject to variations and improvements, it is intended that the foregoing shall be interpreted as merely illustrative of a presently preferred forms of the invention defined by the following claims.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

We claim:

1. A navigational system for guiding a boat onto a trailer, the navigational system comprising:
   at least one marker mounted on the trailer so as to assist the navigational system with estimating a longitudinal axis of the trailer;
   a camera being located on the boat to assist the navigational system with determining a longitudinal axis of the boat, and the camera being located so as to generate images of at least a front area of the boat and the at least one marker on the trailer, during a loading operation;
   an image processing unit for receiving and processing at least some of the images from the camera to determine the at least one marker, and, upon determining the at least one marker, the image processing unit estimating the longitudinal axis of the trailer;
   the image processing unit, based upon the longitudinal axis of the boat and the longitudinal axis of the trailer, generating guidance information to assist a user with aligning the longitudinal axis of the boat with the longitudinal axis of the trailer and facilitate loading of the boat on the trailer;
   the generated guidance information, provided by the image processing unit, comprises a display screen, communicating with the image processing unit, for displaying an image of the camera to the user; and
   the navigational system generates a loading trajectory image overlay, of a desired boat trajectory, which is layered over the image displayed on the display screen of a mobile device.

2. The navigation system according to claim 1, wherein the generated guidance information, provided by the image processing unit, comprises at least one of:

the display screen, communicating with the image processing unit, for displaying the generated images of the camera to the user; and/or one of a speaker and a vibrational device, communicating with the image processing unit, for generating guidance output commands to the user, during the loading operation, to assist the user with following the desired boat trajectory and loading the boat on the trailer.

3. The navigation system according to claim 1, wherein the generated guidance information, provided by the image processing unit, comprises the display screen, communicating with the image processing unit, for displaying the generated images of the camera to the user; and the navigational system generates the loading trajectory image overlay of the desired boat trajectory, a trailer longitudinal axis image overlay, a boat longitudinal axis image overlay and a marker image overlay, as part of a system overlay, which are layered over the image displayed on the display screen of the mobile device.

4. The navigation system according to claim 1, wherein the generated guidance information, provided by the image processing unit, comprises the display screen, communicating with the image processing unit, for displaying the generated images of the camera to the user; and the navigational system generates a trailer longitudinal axis image overlay which is layered over the image displayed on the display screen of the mobile device.

5. The navigation system according to claim 1, wherein the generated guidance information, provided by the image processing unit, comprises the display screen, communicating with the image processing unit, for displaying the generated images of the camera to the user; and the navigational system generates a boat longitudinal axis image overlay which is over the image displayed on the display screen of the mobile device.

6. The navigation system according to claim 1, wherein the generated guidance information, provided by the image processing unit, comprises the display screen, communicating with the image processing unit, for displaying the generated images of the camera to the user; and the navigational system generates a marker image overlay, of each of the at least one marker, which is included as part of a system overlay layered over the image displayed on the display screen of the mobile device.

7. The navigation system according to claim 2, wherein one of:

the desired boat trajectory is designed to gradually align, as the boat approaches the trailer, the longitudinal axis of the boat with the longitudinal axis of the trailer to facilitate loading of the boat on the trailer; and the guidance output commands are designed to gradually align, as the boat approaches the trailer, the longitudinal axis of the boat with the longitudinal axis of the trailer to facilitate loading of the boat on the trailer.

8. The navigation system according to claim 1, wherein the camera is located so that the camera will continuously generate picture frames or images, during the boat loading process, and each such picture will generally include a bow area of the boat, a loading area of the trailer and water, located between the boat and the trailer are located within a field of view of the camera.

9. The navigation system according to claim 1, wherein a central viewing axis of the camera is one of coincident with and offset from the longitudinal axis of the boat.

10. The navigation system according to claim 1, wherein the camera is located at a vantage point vertically above a top perimeter edge of a bow of the boat and adjacent a helm of the boat to facilitate viewing of at least a bow area of the boat, a loading area of the trailer and water, located between the boat and the trailer.

11. The navigation system according to claim 10, wherein one of:

the camera is an integrated camera of the mobile device, and the image processing unit is incorporated into the mobile device; or the camera is a wireless camera which communicates wirelessly with the image processing unit.

12. The navigation system according to claim 11, wherein the mobile device is releasably mounted, via a camera bracket, to the boat adjacent the longitudinal axis of the boat to facilitate viewing of the loading operation, and the camera bracket supports a perimeter edge of the mobile device, without blocking or hindering the field of view of the integrated camera of the mobile device or viewing of the display screen of the mobile device by the user.

13. The navigation system according to claim 10, wherein the camera is a wireless camera which communicates wirelessly with the mobile device, and the wireless camera is mounted to the boat, adjacent the longitudinal axis of the boat, to facilitate viewing of the loading operation.

14. The navigation system according to claim 1, wherein the desired boat trajectory to be followed by the boat during the loading operation is selected from:

a shortest trajectory,
a smoothest trajectory,
a trajectory with a least amount of turnings,
a trajectory with a fewest turning points,
a safest trajectory,
a slowest trajectory, and
a constant velocity trajectory.

15. The navigational system according to claim 1, wherein the navigational system further comprises means for producing a warning signal or command when the boat is deviating from the desired boat trajectory to be followed and corrective action is required.

16. The navigational system according to claim 15, wherein the warning signal or command is one of an optical signal, an acoustical signal, or a haptic signal.

17. The navigational system according to claim 16, wherein a frequency and/or a tempo of the acoustical signal or the haptic signal increases when drastic corrective action is required by the user.

18. A method of guiding a boat onto a trailer, the method comprising:

mounting at least one marker on the trailer so as to assist the method with estimating a longitudinal axis of the trailer;

positioning a camera on the boat to assist the navigational system with determining a longitudinal axis of the boat, and the camera being positioned so as to generate images of at least a front area of the boat and the at least one marker on the trailer, during a loading operation;

receiving and processing, via an image processing unit, the images from the camera to determine the at least one marker, and, upon determining the at least one marker, estimating the longitudinal axis of the trailer;

generating guidance information, via the image processing unit, based upon the longitudinal axis of the boat and the longitudinal axis of the trailer for aligning the longitudinal axis of the boat with the longitudinal axis of the trailer and facilitate loading of the boat on the trailer; and periodically generating guidance output commands to a user, via the image processing unit, during the loading operation to assist the user with following a desired boat trajectory and facilitate loading of the boat on the trailer, wherein one of
- the desired boat trajectory is designed to gradually align, as the boat approaches the trailer, the longitudinal axis of the boat with the longitudinal axis of the trailer to facilitate loading of the boat on the trailer; and
- the guidance output commands are designed to gradually align, as the boat approaches the trailer, the longitudinal axis of the boat with the longitudinal axis of the trailer to facilitate loading of the boat on the trailer.

19. The method according to claim 18, further comprising coupling the image processing unit to an image display screen for sequentially displaying the generated images of the camera to the user.

* * * * *